(12) United States Patent
Hata et al.

(10) Patent No.: US 7,656,072 B2
(45) Date of Patent: Feb. 2, 2010

(54) ACTUATOR USING PIEZOELECTRIC DEVICE

(75) Inventors: Yoshiaki Hata, Ashiya (JP); Tadatomi Sougawa, Sakai (JP)

(73) Assignee: Konica Minolta Holdings, Inc., Tokyo (JP)

( * ) Notice: Subject to any disclaimer, the term of this patent is extended or adjusted under 35 U.S.C. 154(b) by 441 days.

(21) Appl. No.: 11/133,898

(22) Filed: May 19, 2005

(65) Prior Publication Data
US 2005/0258712 A1 Nov. 24, 2005

(30) Foreign Application Priority Data
May 21, 2004 (JP) ............... 2004-151477

(51) Int. Cl.
*H01L 41/09* (2006.01)
*H01L 41/053* (2006.01)
*H02N 2/04* (2006.01)

(52) U.S. Cl. ..................................... 310/328
(58) Field of Classification Search ................. 310/328, 310/323.05, 323.06, 311; *H01L 41/08*
See application file for complete search history.

(56) References Cited

U.S. PATENT DOCUMENTS

2002/0030422 A1* 3/2002 Hata ..................... 310/323.17
2003/0222538 A1* 12/2003 Hata et al. .................. 310/328

FOREIGN PATENT DOCUMENTS

| JP | 8-29658 A | | 2/1996 |
| JP | 10-80165 A | | 3/1998 |
| JP | 2002-95274 A | | 3/2002 |
| JP | 200295274 | * | 3/2002 |
| JP | 2004-15864 A | | 1/2004 |

OTHER PUBLICATIONS

Machine translation of JP 08029658.*
Japanese "Notice of Grounds for Rejection", dated Dec. 26, 2006, for counterpart Japanese Patent Application No. 2004-151477; along with an English-language translation thereof.

* cited by examiner

*Primary Examiner*—Walter Benson
*Assistant Examiner*—Derek J Rosenau
(74) *Attorney, Agent, or Firm*—Sidley Austin LLP

(57) ABSTRACT

In order to provide an actuator having great driving force and high impact resistance, an actuator of the present invention has a driving shaft 5 that can be vibrated in the shaft direction by a piezoelectric device 4 provided at its one end and a moving member 6 that is friction-engaged with the driving shaft 5 and moves on the driving shaft 5 due to the vibration of the driving shaft 5. The driving shaft 5 has two parallel shaft sliding faces 5a on its surface. The moving member 6 has two moving member sliding faces 7e, 8e that are in slide-contact with the shaft sliding faces 5a. The moving member 6 is friction-engaged with the driving shaft 5 such that the moving member sliding faces 7e, 8e clamp the shaft sliding faces 5a.

14 Claims, 9 Drawing Sheets

ACTUATOR USING PIEZOELECTRIC DEVICE

This application is based on application No. JP2004-151477 filed in Japan, the contents of which is hereby incorporated by reference.

BACKGROUND OF THE INVENTION

1. Field of the Invention

The present invention relates to an improved actuator. More particularly, the present invention relates to an actuator using a piezoelectric device. Further more particularly, the present invention relates to an actuator whose driving force and impact resistance are enhanced.

2. Description of the Related Art

Japanese Unexamined Patent Application No. 2002-95274 and Japanese Unexamined Patent Application No. 2004-15864 disclose an actuator that causes a moving member to be friction-engaged with a driving shaft that vibrates by a piezoelectric device and moves the moving member along the driving shaft by controlling the vibration waveform of the driving shaft. In the actuator of this type, the moving member is friction-engaged with the driving shaft such that a main body of the moving member engaged with the driving shaft and a spring clamp the driving shaft (via a holding member). Further, Japanese Unexamined Patent Application No. 10-80165 discloses an actuator that causes a driving shaft to be friction-engaged with a rotatable disk in the tangential direction in the vicinity of the disk, thereby being capable of controlling the rotation angle.

The conventional actuator described above gives acceleration, which exceeds the friction force by which the moving member is engaged with, to the driving shaft by the piezoelectric device for causing the moving member to slide relative to the driving shaft, wherein the driving force of the actuator is generated when the moving member is friction-engaged with the driving shaft and moved together therewith. Therefore, it is preferable that the spring is strengthened to increase the normal load to the friction face and the friction force by which the moving member is engaged with the driving shaft is increased. However, in the conventional actuator, the holding member pressed by the spring is in contact with the round surface of the driving shaft on the line in the shaft direction. Therefore, local concentration of the normal load may be generated due to a trivial factor such as a torsion between the driving shaft and the moving member or adherence of dust on the sliding face, so that there may be a case where great friction force is generated. The normal load is required to be set small to such a degree that the moving member can be slidably moved even in this case, thereby entailing a problem that the driving force cannot be set great.

Further, in a device having the actuator installed therein as disclosed in Japanese Unexamined Patent Application No. 2002-95274 and Japanese Unexamined Patent Application No. 2004-15864, acceleration of several thousand G is exerted on the moving member when it receives an impact due to, for example, a fall. The moving member may be fallen off over the spring or the spring may be damaged due to excessive force exerted thereon.

OBJECTS AND SUMMARY

The present invention is accomplished in view of the aforesaid circumstance, and aims to provide an actuator having great driving force and high impact resistance.

In order to attain the above-mentioned and other objects, an actuator in a certain aspect of the present invention comprises a driving shaft that is vibratable in the shaft direction by a piezoelectric device disposed at one end and a moving member that is friction-engaged with the driving shaft and moves on the driving shaft by the vibration of the driving shaft, wherein the driving shaft has two shaft sliding faces, each being parallel to each other, and the moving member has two moving member sliding faces, each being in slide-contact with each of the shaft sliding faces, wherein the moving member is friction-engaged with the driving shaft such that the shaft sliding faces are clamped by the moving member sliding faces.

According to this structure, the moving member is friction-engaged with the driving shaft on two planes. Therefore, local concentration of the normal load is difficult to be generated. Further, force for clamping the shaft sliding faces is increased for increasing the friction force, resulting in being capable of increasing the driving force.

In an actuator in a certain aspect of the present invention, the driving shaft may be a bar-like member composed of four faces of the shaft sliding faces and two curved faces projecting outwardly.

This structure can reduce as much as possible the contact between the driving shaft and the moving member other than the contact between the shaft sliding faces and the moving member sliding faces, with the result that the dynamic resistance of the actuator can be reduced. Further, the curved faces serve as a refuge of a dust adhered onto the shaft sliding faces, so that the friction force by which the moving member is engaged with the driving shaft can be stabilized. Therefore, a stabilized operation can be obtained even if the driving force of the actuator is set great.

In an actuator in a certain aspect of the present invention, the moving member may include a moving member main body having one of the moving member sliding faces, a cap member having the other of the moving member sliding faces and a spring that presses the moving member main body and the cap member toward the driving shaft.

This structure generates friction force as the moving member sliding faces of the moving member are correctly pressed toward the shaft sliding faces of the driving shaft in the normal direction with both orientations agreed with each other. Therefore, the friction force is stabilized, whereby the spring is strengthened to increase the driving force of the actuator.

In an actuator in a certain aspect of the present invention, the moving member main body and the cap member may have a direct-regulating structure wherein both are brought into contact with each other to lock with each other when one end tries to be separated, and an indirect-regulating structure wherein both are brought into contact with the spring to be locked to each other via the spring when the other end tries to be separated.

This structure prevents the moving member main body and the cap member from being greatly separated from each other even if an impact is given to the actuator. Therefore, the moving member main body does not fall off from the driving shaft.

An actuator in a certain aspect of the present invention has a driving shaft that is vibratable in the shaft direction by a piezoelectric device disposed at one end and a moving member that is friction-engaged with the driving shaft and moves on the driving shaft by the vibration of the driving shaft, wherein the moving member includes a moving member main body, a cap member and a spring urging such that the moving member main body and the cap member clamp the driving shaft, wherein the moving member main body and the cap member may have a direct-regulating structure wherein both are brought into contact with each other to lock with each other when one end tries to be separated, and an indirect-regulating structure wherein both are brought into contact with the spring to be locked to each other via the spring when the other end tries to be separated.

This structure generates friction force as the moving member sliding faces of the moving member are correctly pressed toward the shaft sliding faces of the driving shaft in the normal direction with both orientations agreed with each other. Therefore, the friction force is stabilized, whereby the spring is strengthened to increase the driving force of the actuator. Further, even if an impact is given to the actuator, the moving member main body and the cap member are not greatly separated from each other. Therefore, the moving member main body does not fall off from the driving shaft.

In an actuator in a certain aspect of the present invention, the spring has two points of application at both ends for clamping the driving shaft via the moving member main body and the cap member, wherein the indirect-regulating structure may have a configuration in which the end section of the moving member main body and the end section of the cap member are arranged in a regulation section provided between the two points of application of the spring.

According to this structure, the force for separating the moving member main body and the cap member is received by the regulation section even when an impact is given to the actuator, whereby great bending force is not applied to the spring, and hence, the spring is not broken.

In an actuator in a certain aspect of the present invention, the indirect-regulating structure may have a configuration in which the spring is fixed to the moving member main body and the end section of the cap member is arranged between the regulation section provided at the spring and the moving member main body.

According to this structure, the spring is not required to go around the outer side of the moving member, whereby the degree of freedom in designing the actuator having high impact resistance is increased.

In an actuator in a certain aspect of the present invention, a gap may be formed between the moving member and the face other than the shaft sliding faces of the driving shaft.

According to this structure, the degree of freedom can be given to the moving member in the angle around the normal of the shaft sliding faces. Further, the moving member can sideslip in the direction parallel to the shaft sliding faces and perpendicular to the driving shaft. Therefore, even if torsion around the normal of the shaft sliding faces is applied to the moving member or the moving direction of the member moved by the moving member is slightly shifted from the direction of the driving shaft, surplus load is not applied to the actuator, whereby the actuator is stably driven.

In an actuator in a certain aspect of the present invention, the moving member may be attached to one end of a rotation member that is rotatable around the shaft parallel to the normal of the shaft sliding faces.

This structure can provide a small-sized rotary actuator that performs an angular adjustment of the rotation member.

As described above, the present invention can provide an actuator having great driving force and high impact resistance.

BRIEF DESCRIPTION OF THE DRAWINGS

These and other objects and features of the present invention will become apparent from the following description of preferred embodiments thereof taken in conjunction with the accompanying drawings, in which.

In the following description, like parts are designated by like reference numbers throughout the several drawings.

DETAILED DESCRIPTION OF THE PREFERRED EMBODIMENTS

An actuator according to an embodiment in one aspect of the present invention will be explained hereinafter with reference to drawings.

Figure 1:
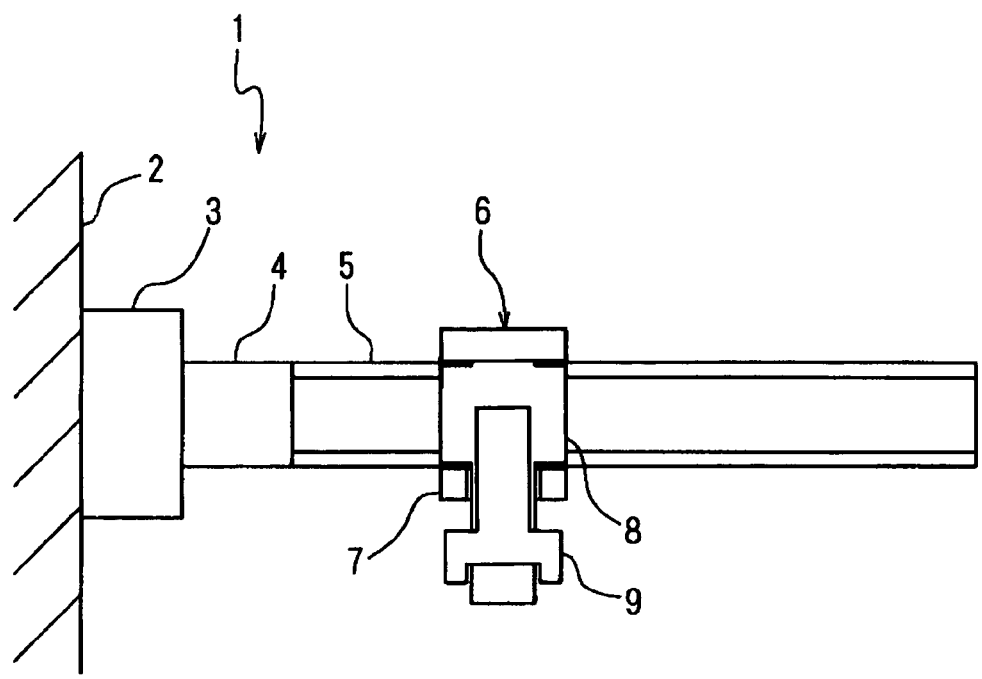
FIG. 1 is a plan view of an actuator according to a first embodiment of the invention.
Figure 2:
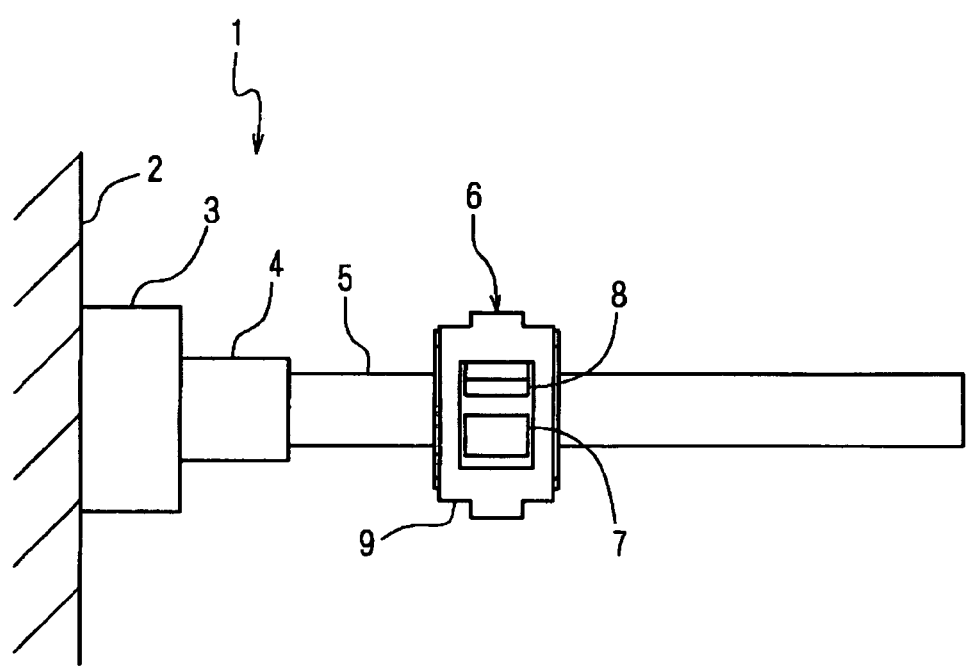
FIG. 2 is a side view of the actuator of FIG. 1.

FIGS. 1 and 2 respectively show a plan view and a side view of an actuator 1 according to a first embodiment of the invention. The actuator 1 is formed such that a weight 3, piezoelectric device 4 and driving shaft 5 are piled up to a support member 2 in this order and bonded with one another, wherein the driving shaft 5 is fitted to a moving member 6. The moving member 6 is composed of a moving member main body 7, cap member 8 and spring 9.

Figure 3:
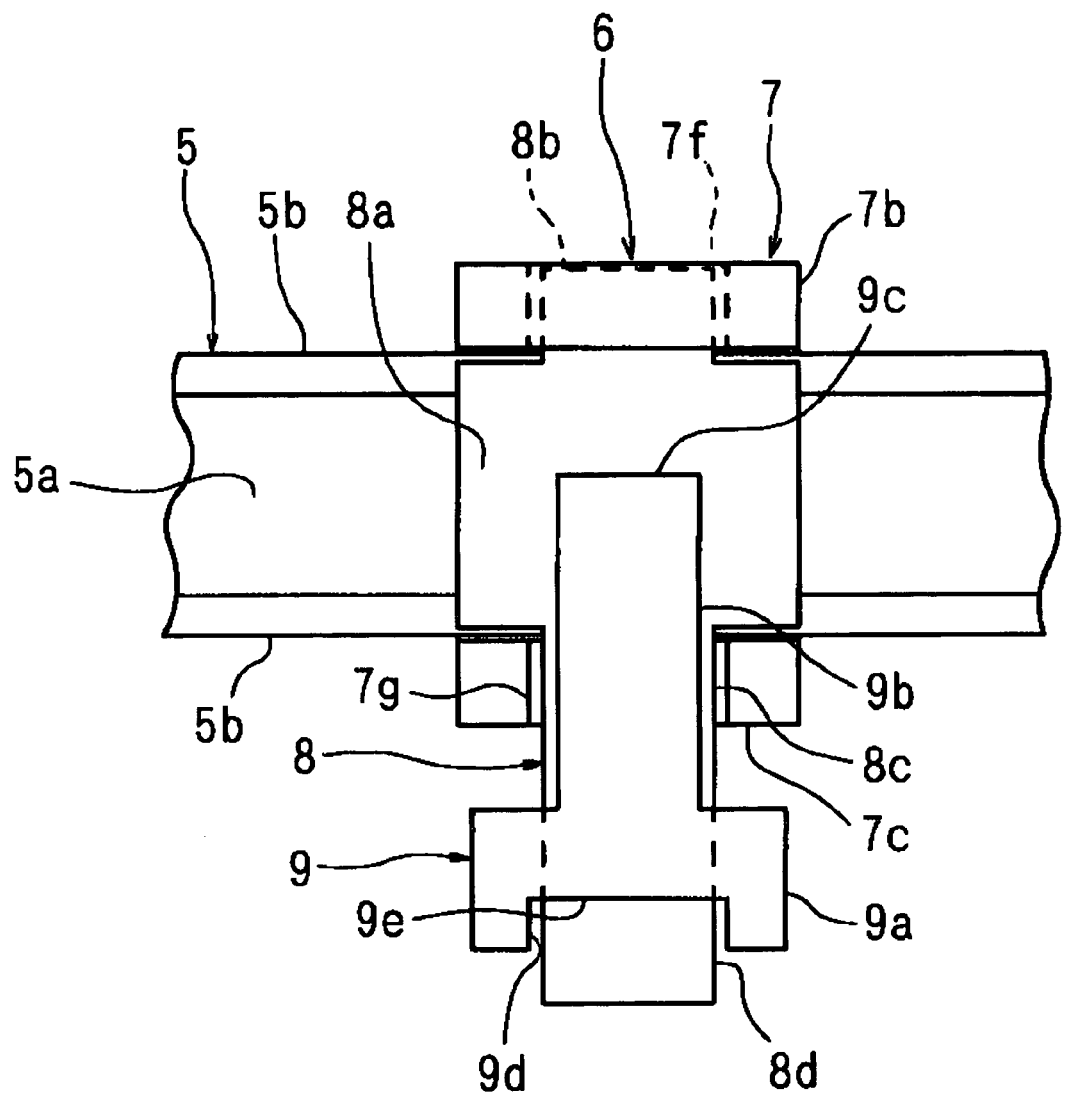
FIG. 3 is an enlarged plan view of the actuator of FIG. 1.
Figure 4:
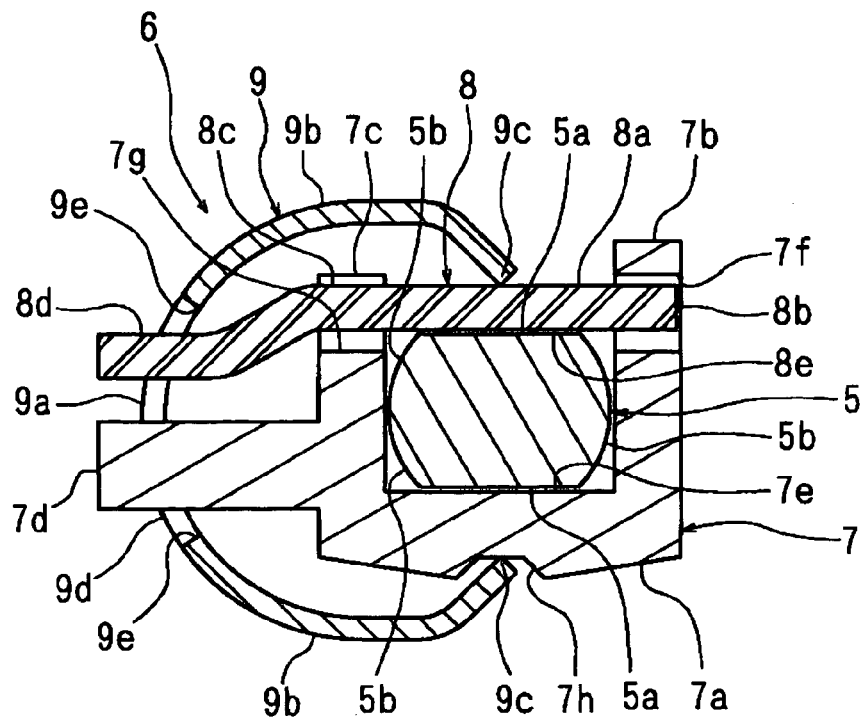
FIG. 4 is a sectional view of the actuator of FIG. 1 in a direction orthogonal to a shaft.

FIG. 3 is an enlarged view of FIG. 1 and FIG. 4 shows a sectional view at the center of the moving member 6 in the direction orthogonal to the driving shaft 5. The configuration of the actuator 1 will be explained in detail with reference to these drawings. The driving shaft 5 is a shaft composed of four faces: two shaft sliding faces 5a that are flat and parallel to each other and two curved faces 5b that communicate with the end sections of the shaft sliding faces 5a and are arched so as to project outwardly. The moving member main body 7 forms a channel that receives the driving shaft 5 by a bottom section 7a and wall sections 7b, 7c that extend from both end sections of the bottom section 7a at right angles. The moving member main body 7 further has a projecting end section 7d projecting from the wall section 7c in the direction orthogonal to the shaft. The face of the bottom section 7a that is the bottom of the channel serves as a moving member sliding face 7e that is a flat plane coming in close contact with the shaft sliding face 5a of the driving shaft 5. An insertion hole 7f is provided in the vicinity of the top end of the wall section 7b, while a guide channel 7g is provided at the top end of the wall section 7c. A spring channel 7h parallel to the driving shaft 5 is provided at the center on the face of the bottom section 7*a* opposite to the moving member sliding face 7*e*.

A cap member 8 is composed of a cap section 8*a* covering the section above the channel of the moving member main body 7, an insertion section 8*b* projecting into the insertion hole 7*f* at the wall section 7*b*, a fitted section 8*c* fitted into the guide channel 7*g* and an extending end section 8*d* that extends from the fitted section 8*c* so as to be parallel to the projecting end section 7*d*. The cap member 8 is formed such that the bottom face of the cap section 8*a* serves as a moving member sliding face 8*e* that is flat and comes in close contact with the other shaft sliding face 5*a* of the driving shaft 5, wherein the insertion section 8*b* is inserted into the insertion hole 7*f* of the moving member main body 7 to form a direct-regulating structure. A spring 9 is made by bending a metal plate into a C-shape, and is composed of two blade sections 9*c* that extend from a base section 9*a* so as to bend toward both sides and reach the spring channel 7*h* and the center of the face of the cap section 8*a* opposite to the moving member sliding face 8*e*, respectively. The leading ends of the blade sections 9*b* become close to each other to form two points of application 9*c* that urge the moving member main body 7 and the cap member 8 so as to press them toward the driving shaft 5. A rectangular regulation hole 9*d* is formed at the center of the base section 9*a*. The projecting end section 7*d* and the extending end section 8*d* are inserted into this regulation hole 9*d* to provide an indirect-regulating structure. Two edges of the regulation hole 9*d* on the side of both blade sections 9*b* serve as regulating sections 9*e* that can contact to the projecting end section 7*d* and the extending end section 8*d*.

The function of the actuator 1 having the above-mentioned structure will be explained. The moving member main body 7 and the cap member 8 are provided such that the moving member sliding face 7*e* and the moving member sliding face 8*e* clamp two shaft sliding faces 5*a* of the driving shaft 5 from both sides by the spring 9 attached from the side of the projecting end section 7*d* and the extending end section 8. This causes friction force between the driving shaft 5 and the moving member 6 with the urging force of the spring 9 acting as normal drag, whereby the moving member 6 is engaged with the driving shaft 5 with this friction force. It is necessary that, with this state where the moving member 6 is friction-engaged with the driving shaft 5, the insertion hole 7*f* and the guide channel 7*g* of the moving member main body 7 are sized or positioned so as not to be in contact with the insertion section 8*b* and the fitted section 8*c* of the cap member 8 in the normal direction of the shaft sliding faces 5*a* (and moving member sliding faces 7*e*, 8*e*).

When variable voltage is applied to the piezoelectric device 4, the piezoelectric device 4 expands or contracts in the shaft direction of the driving shaft 5. Since one side of the piezoelectric device 4 is fixed to the support member 2 via the weight 3, the expansion and contraction of the piezoelectric device 4 makes a vibration in the shaft direction of the driving shaft 5. The weight 3 relaxes the force applied from the piezoelectric device 4 by its inertial force in order to prevent that the support member 2 warps and vibrates. The driving shaft 5 moves in the shaft direction according to the voltage waveform applied to the piezoelectric device 4. When its acceleration exceeds a value obtained by dividing the friction force between the driving shaft 5 and the moving member 6 by the mass of the moving member (total of the moving member and the member for driving the moving member), the moving member 6 cannot move with the driving shaft 5 as accelerated, so that the moving member 6 slidably relatively moves on the driving shaft 5, trying to stay here. When the driving shaft 5 is then slowly accelerated to move in the opposite direction, the moving member 6 moves with the driving shaft 5 as friction-engaged with the driving shaft 5. This state looks like the moving member 6 moves in the shaft direction of the driving shaft 5. As described above, by the piezoelectric device 4, the driving shaft 5 is moved in one direction with the acceleration exceeding the friction force of the moving member 6 and moved in the opposite direction with the acceleration not exceeding the friction force of the moving member 6, whereby the actuator 1 can position the moving member 6.

The driving force generated by the actuator 1 is in proportion to the average moving speed of the moving member 6 and the friction force with respect to the driving shaft 5. Therefore, in order to increase the driving force of the actuator 1, the average moving speed of the moving member 6 and/or friction force with respect to the driving shaft 5 may be increased. However, in order to operate the actuator 1, the maximum acceleration of the driving shaft 5 should overcome the friction force between the moving member 6 and the driving shaft 5 to slidably move the moving member 6. The maximum acceleration and the maximum moving distance of the driving shaft 5 are determined by the characteristic of the piezoelectric device 4, so that the maximum value of the friction force is also determined by the characteristic of the piezoelectric device 4. Since the shaft sliding faces 5*a* and the moving member sliding faces 7*e*, 8*e* come in wide contact with each other with the face having an area obtained by a product of the width of the shaft sliding faces 5*a* and the length in the shaft direction of the moving member sliding faces 7*e*, 8*e* in this embodiment, the urging force of the spring 9 is difficult to concentrate on one point, so that the increase in the friction force due to the local contact hardly occurs. Therefore, the actuator 1 is not required to set the normal drag to be small by considering the unevenness of the friction force. As a result, the spring 9 can be maximally strengthened to increase the normal drag, whereby the friction force between the moving member 6 and the driving shaft 5 can be maximally increased, and consequently, the driving force can be increased.

Subsequently explained is a phenomenon when the actuator 1 receives an impact due to, for example, a falling. When an impact is given to the support member 2 of the actuator 1, acceleration of as much as several thousand G is applied to the driving shaft 5 fixed to the support member 2. If the upward acceleration is applied to the driving shaft 5 in FIG. 4, the driving shaft 5 transmits the acceleration of several thousand G to the cap member 8 of the moving member 6 upwardly from the shaft sliding faces 5*a* to the moving member sliding face 8*e*. In this case, the moving member main body 7 tries to stay here due to the inertial force, and only the cap member 8 pushes open the spring 9 to rise so as to be away from the moving member main body 7. At one end of the moving member 6, the insertion section 8*b* composing the direct-regulating structure comes in contact with the edge at the upper side of the insertion hole 7*f*, when the cap member 8 tries to rise as being away from the moving member main body 7. In this manner, the insertion section 8*b* and the insertion hole 7*f* are engaged to be locked with each other so as not to be separated from each other. As a result, the insertion section 8*b* acts so as to lift up the wall section 7*b*. At the other end of the moving member 6, when the extending end section 8*d* of the cap member 8 composing the indirect-regulating structure tries to rise as being away from the projecting end section 7*d* of the moving member main body 7, the extending end section 8*d* comes in contact with the regulating section 9*e* at the upper section of the regulation hole 9*d* of the spring 9, so that it acts to lift up the spring 9. However, the spring 9 is locked to the moving member main body 7, since the lower-side regulating section 9e comes in contact with the projecting end section 7d of the moving member main body 7. Specifically, the extending end section 8d of the cap member 8 and the projecting end section 7d of the moving member main body 7 are locked to each other via the spring 9, which means that the cap member 8 lifts up the moving member main body 7 via the spring 9.

The distance between two regulating sections 9e of the spring 9 is small and great bending is not exerted on the spring 9, resulting in that there is no chance that the spring 9 is broken down. Further, the force exerted on the base section 9a of the spring 9 is generally tensile force, so that the spring 9 is hardly elastically deformed. Therefore, the cap member 8 does not rise to such a degree that the fitted section 8c is removed from the guide channel 7g of the moving member main body 7, whereby the moving member 6 does not fall off from the driving shaft 5. As described above, the spring 9 is not damaged and the moving member 6 does not fall off even if an impact is given to the actuator 1 according to this embodiment.

Figure 5:
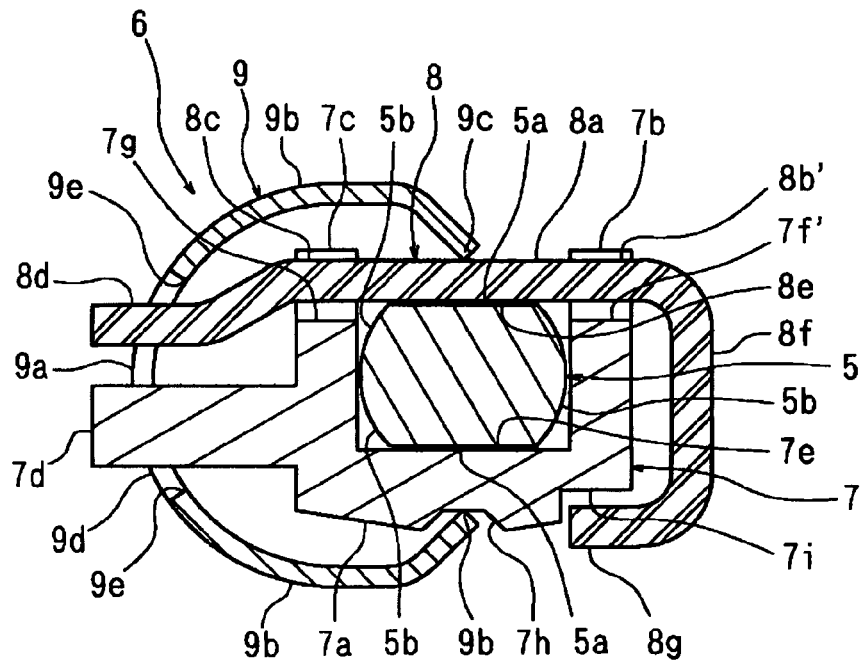
FIG. 5 is a sectional view of an actuator according to a second embodiment of the invention in a direction normal to a shaft.

FIG. 5 relates to an actuator 1 according to a second embodiment of the present invention, and shows a sectional view of a moving member 6 that is different from that of the first embodiment. It should be noted that same numerals are given to the components same as those in the first embodiment, thereby omitting the explanation thereof.

Provided at the top end of the wall section 7b of the moving member main body 7 is a guide channel 7f', like the case of the wall section 7c, and provided at the end section of the bottom section 7a that is the lower end of the wall section 7b is a regulating channel 7i. The cap member 8 has a fitted section 8b' that projects from the cap section 8a and fitted into the guide channel 7f' of the moving member main body 7. The cap member 8 also has a vertical section 8f that extends vertically down from the leading end of the fitted section 8b' along the moving member main body 7 and a lock end section 8g that extends from the leading end of the vertical section 8f into the regulating channel 7i of the moving member main body 7 to compose a direct-locking structure.

In this embodiment too, the shaft sliding faces 5a and the moving member sliding faces 7e, 8e come in wide contact with each other. Therefore, the spring 9 can be strengthened to increase the normal drag, and the friction force between the moving member 6 and the driving shaft 5 is increased, thereby being capable of increasing the driving force of the actuator 1.

In case where an impact is given to the actuator 1 and the upward acceleration is applied to the driving shaft 5, the driving shaft 5 tries to lift up the cap member 8. However, the lock end section 8g of the cap member 8 comes in contact with the lock channel 7i of the moving member main body 7 so as to act to lift up the bottom section 7a, and the extending end section 8d of the cap member 8 acts to lift up the projecting end section 7d of the moving member main body 7 via the base section 9a of the spring 9. Therefore, the moving member 6 dose not fall off from the driving shaft 5, and further, the spring 9 is not broken due to excessive bending force applied thereto.

Figure 6:
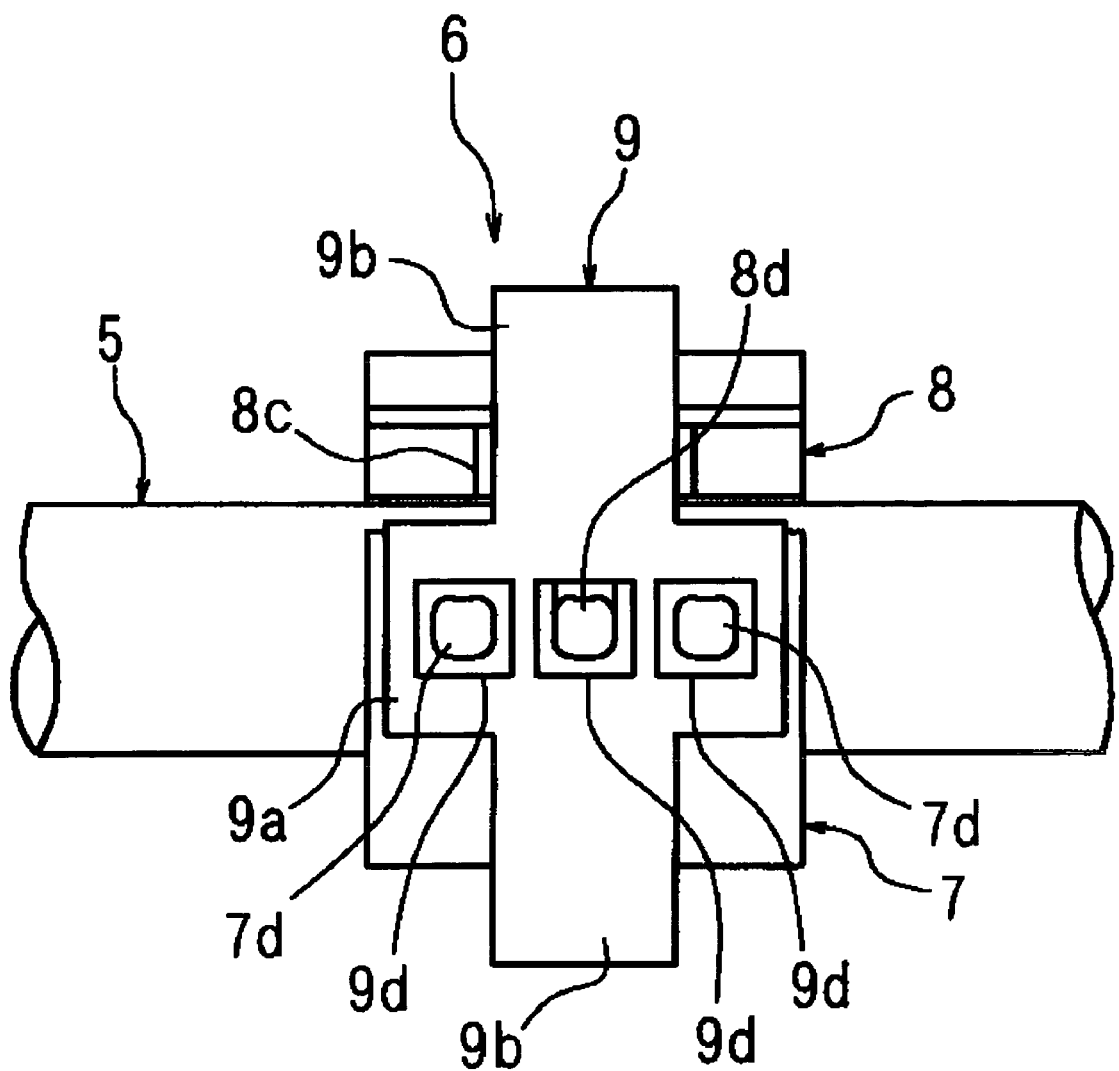
FIG. 6 is a side view of an actuator according to a third embodiment of the invention.
Figure 7:
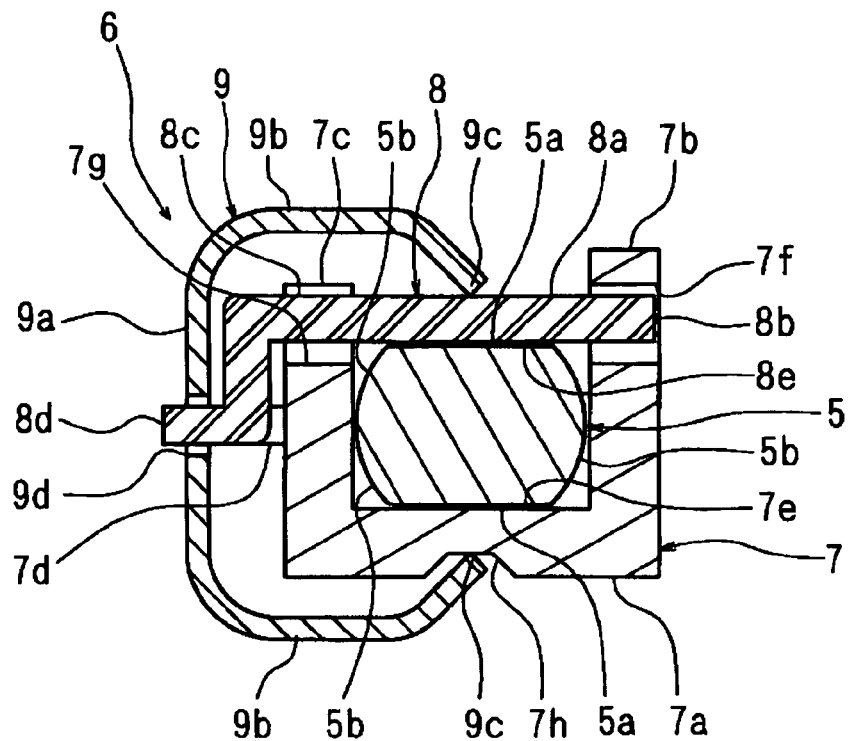
FIG. 7 is a sectional view of the actuator of FIG. 6 in a direction orthogonal to a shaft.

FIGS. 6 and 7 relate to an actuator 1 according to a third embodiment of the present invention, and show respectively a side view and a sectional view of a moving member 6 that is different from those of the first and second embodiments. Two small projecting end sections 7d are provided at the moving member main body 7 of this embodiment. These projecting end sections 7d are inserted into both-side two of three regulating holes 9d juxtaposed at the base section 9a of the spring 9. The extending end section 8d of the cap member 8 extends from the fitted section 8c as bending so as to position between two projecting end sections 7d, and is inserted into the central regulating hole 9d of the spring 9. As described above, in this embodiment, the projecting end sections 7d of the moving member main body 7 and the extending end section 8d of the cap member 8 are inserted in the different regulating holes 9d, thereby forming an indirect-regulating structure.

In this embodiment too, the shaft sliding faces 5a and the moving member sliding faces 7e, 8e come in wide contact with each other. Therefore, the spring 9 can be strengthened to increase the normal drag, and the friction force between the moving member 6 and the driving shaft 5 is increased, thereby being capable of increasing the driving force of the actuator 1.

In case where an impact is given to the actuator 1 and the upward acceleration is applied to the driving shaft 5, the driving shaft 5 tries to lift up the cap member 8. However, the insertion section 8b of the cap member 8 acts to lift up the wall section 7b of the moving member main body 7, and the extending end section 8d of the cap member 8 acts to lift up the projecting end sections 7d of the moving member main body 7 via the base section 9a of the spring 9. Therefore, the moving member 6 dose not fall off from the driving shaft 5, and further, the spring 9 is not broken due to excessive bending force applied thereto.

Figure 8:
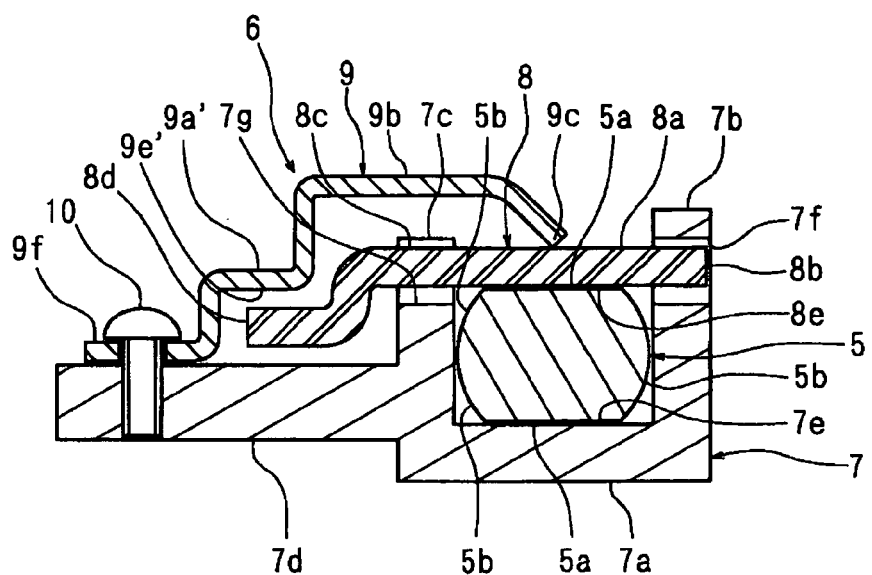
FIG. 8 is a sectional view of an actuator according to a fourth embodiment of the invention in a direction orthogonal to a shaft.

FIG. 8 relates to an actuator 1 according to a fourth embodiment of the present invention, and shows a sectional view of a moving member 6 that is different from that of the first, second and third embodiments. The spring 9 in this embodiment is composed of a base section 9a', one blade section 9b extending from the base section 9a' to the center of the cap section 8a of the cap member 8 and a fixed section 9f that extends from the base section 9a' and fixed to the projecting end section 7d of the moving member main body 7 with a screw 10. The base section 9a' is bent so as to form a regulating section 9e' that clamps the extending end section 8d of the cap member 8 with a gap with the projecting end section 7d of the moving member main body 7. The extending end section 8d is arranged between the regulating section 9e' and the projecting end section 7d, thereby forming an indirect-regulating structure.

In this embodiment too, the shaft sliding faces 5a and the moving member sliding faces 7e, 8e come in wide contact with each other. Therefore, the spring 9 can be strengthened to increase the normal drag, and the friction force between the moving member 6 and the driving shaft 5 is increased, thereby being capable of increasing the driving force of the actuator 1.

In case where an impact is given to the actuator 1 and the upward acceleration is applied to the driving shaft 5, the driving shaft 5 tries to lift up the cap member 8. However, the insertion section 8b of the cap member 8 acts to lift up the wall section 7b of the moving member main body 7, and the extending end section 8d of the cap member 8 comes in contact with the regulating section 9e' of the spring 9 to act to lift up the projecting end section 7d of the moving member main body 7 via the spring 9 and the screw 10. Therefore, the moving member 6 does not fall off from the driving shaft 5. Further, the distance between the regulating section 9e' and the fixed section 9f of the spring 9 is small, so that the spring 9 is not broken due to excessive bending force applied thereto.

Figure 9:
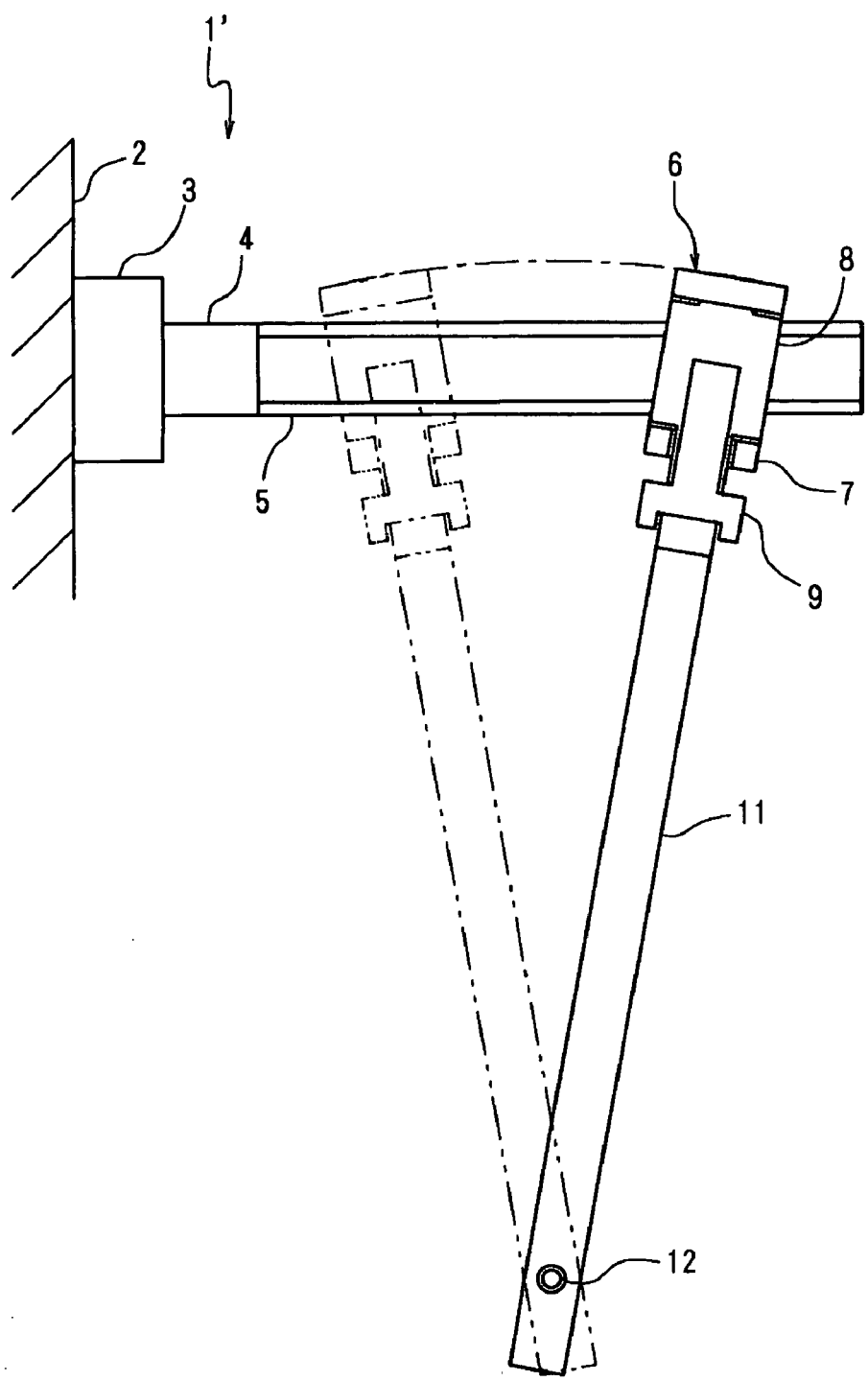
FIG. 9 is a plan view of an actuator according to a fifth embodiment of the invention.
Figure 10:
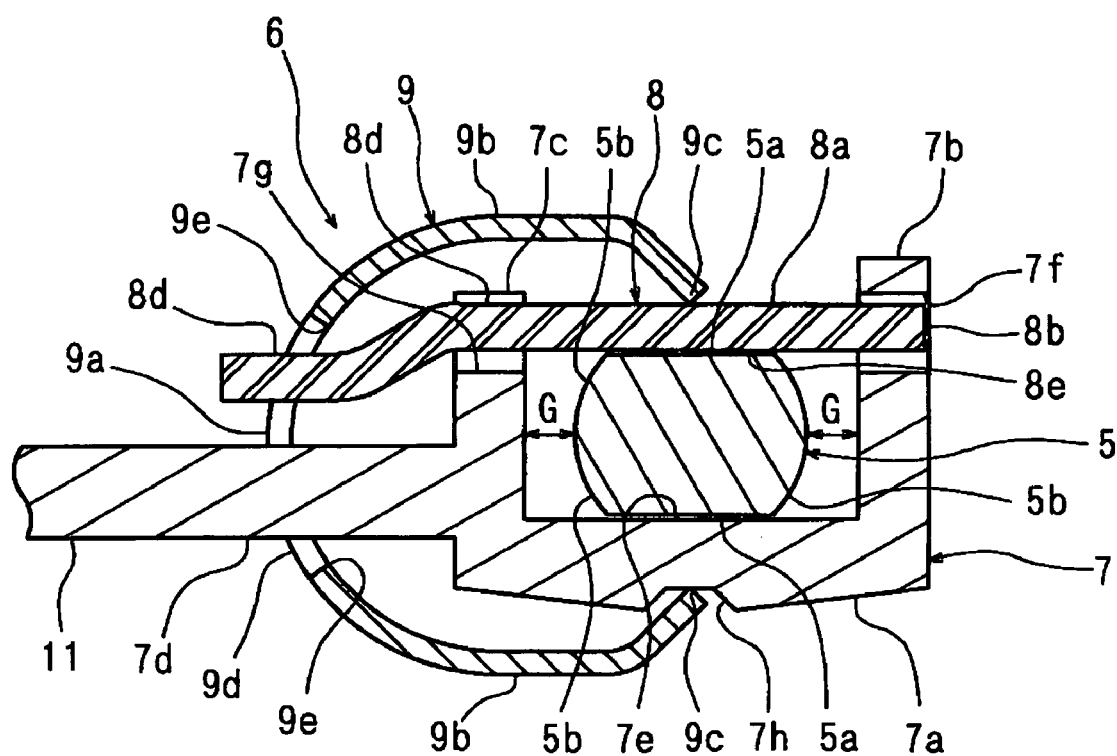
FIG. 10 is a sectional view of the actuator of FIG. 9 in a direction orthogonal to a shaft.

FIG. 9 shows an actuator 1' according to a fifth embodiment of the present invention, and FIG. 10 shows a sectional view of a moving member main body 7 of the actuator 1'. This embodiment has a rotation member 11 that is formed by extending the projecting end section 7d of the moving member main body 7, wherein the leading end of the rotation member 11 is rotatably attached to a rotation shaft 12 that is parallel to the normal of the shaft sliding face. Further, a gap G is provided between the wall sections 7b, 7c of the moving member main body 7 and the curved faces 5b of the driving shaft 5.

The moving member 6 in this embodiment has the gap G, so that it can rotate to some degree around the normal of the shaft sliding face 5a, and can move to some degree in the direction orthogonal to the shaft that is parallel to the shaft sliding face 5a. Even when the rotation member 11 is rotated around the rotation shaft 12, the moving member 6 is able to keep on friction-engaging with the driving shaft 5 as clamping the shaft sliding faces 5a of the driving shaft 5 with the moving member sliding faces 7e, 8e, without the contact of the wall sections 7b, 7c of the moving member main body 7 to the curved faces 5b of the driving shaft 5.

In this case, the shaft sliding faces 5a and the moving member sliding faces 7e, 8e come in wide contact with each other. Therefore, the spring 9 can be strengthened to increase the normal drag, and the friction force between the moving member 6 and the driving shaft 5 is increased, thereby being capable of increasing the driving force of the actuator 1. Further, even when an impact is given to the actuator 1, the insertion hole of the moving member main body 7 and the regulation hole 9d of the spring 9 lock the cap member 8, whereby there is no chance that the moving member 6 falls off from the driving shaft 5.

Figure 11:
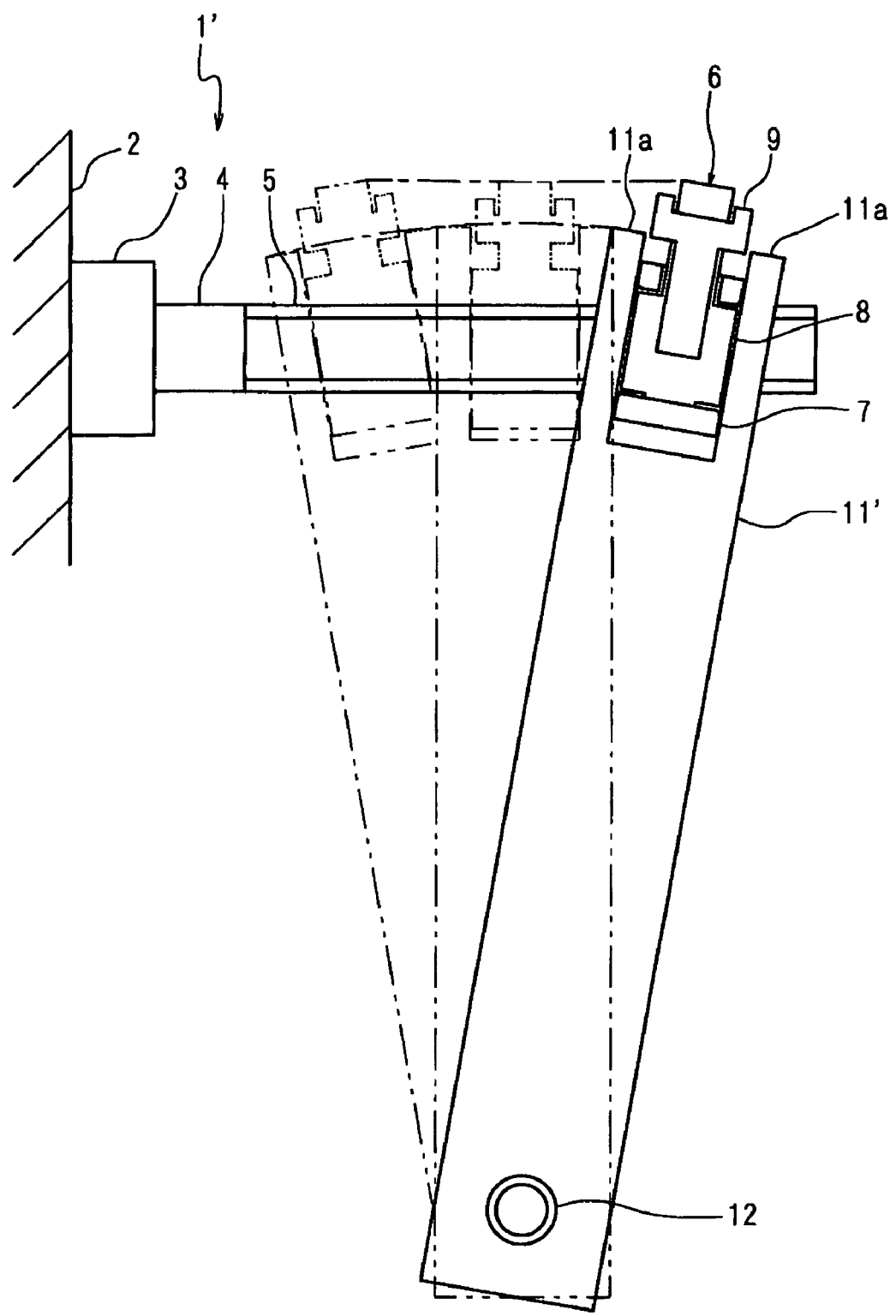
FIG. 11 is a plan view of an actuator according to a sixth embodiment of the invention.
Figure 12:
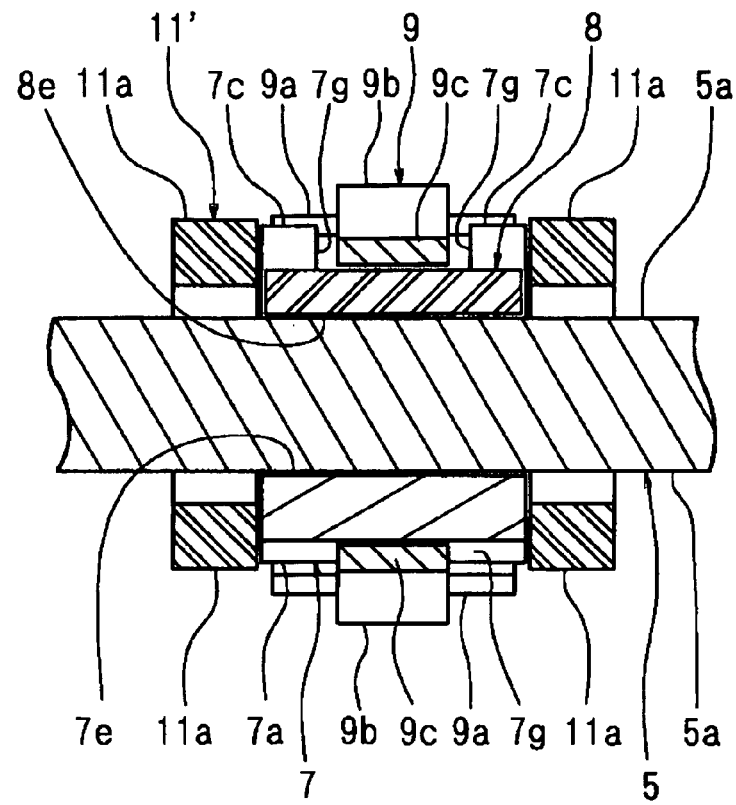
FIG. 12 is a sectional view of the actuator of FIG. 11 in the shaft direction.
Figure 13:
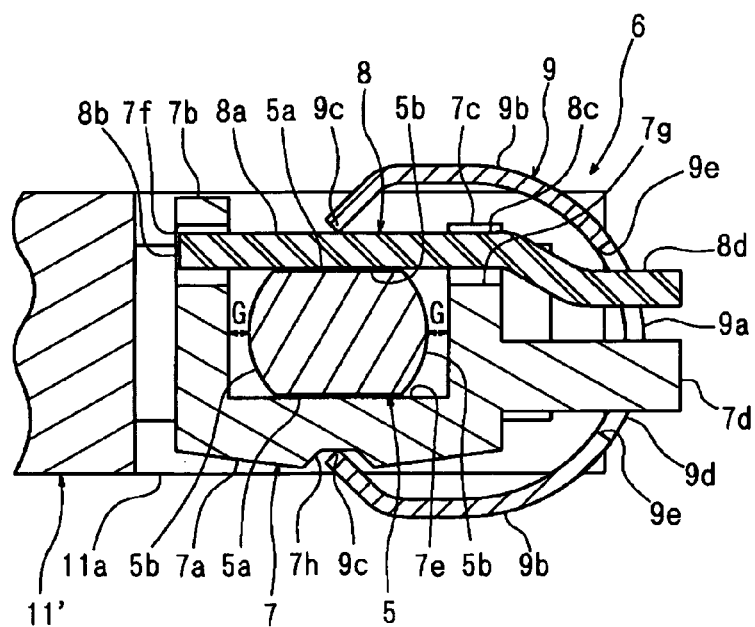
FIG. 13 is a sectional view of the actuator of FIG. 11 in a direction orthogonal to a shaft.

FIG. 11 shows an actuator 1' according to a sixth embodiment of the present invention, and FIGS. 12 and 13 respectively show a section of the driving shaft 5 of the actuator 1' in the shaft direction and a section thereof in the direction orthogonal to the shaft. In this embodiment, a rotation member 11' is another member independent of the moving member 6, and has a hole into which the driving shaft 5 is inserted and two slide-contact sections 11a that come in slide-contact with both side faces of the moving member main body 7 of the moving member 6. Further, a gap G is formed between the wall sections 7b, 7c of the moving member main body 7 and the curved faces 5b of the driving shaft 5, but the gap G is smaller that that of the fifth embodiment.

The moving member 6 in this embodiment has the gap G, so that it can rotate to some degree around the normal of the shaft sliding faces 5a, and the movement of the moving member 6 on the driving shaft 5 rotates the rotation member 11'. The change in the distance between the moving member 6 and the rotation shaft 12 is absorbed by the slide movement of the moving member main body 7 of the moving member 6 on the slide-contact sections 11a of the rotation member 11'.

In this embodiment too, the shaft sliding faces 5a and the moving member sliding faces 7e, 8e come in wide contact with each other. Therefore, the spring 9 can be strengthened to increase the normal drag, and the friction force between the moving member 6 and the driving shaft 5 is increased, thereby being capable of increasing the driving force of the actuator 1. Further, even when an impact is given to the actuator 1, the insertion hole of the moving member main body 7 and the regulation hole 9d of the spring 9 lock the cap member 8, whereby there is no chance that the moving member 6 falls off from the driving shaft 5.

Although the present invention has been fully described by way of examples with reference to the accompanying drawings, it is to be noted that various changes and modifications will be apparent to those skilled in the art. Therefore, unless such changes and modification depart from the scope of the present invention, they should be construed as being included therein.

What is claimed is:

1. An actuator comprising:
a driving shaft that is vibratable in the shaft direction by a piezoelectric device disposed at one end; and
a moving member that is friction-engaged with the driving shaft and moves on the driving shaft by the vibration of the driving shaft,
wherein the driving shaft has two flat shaft sliding faces, each being parallel to each other, and the moving member has two flat moving member sliding faces, each being in slide-contact with each of the flat shaft sliding faces, wherein the moving member is friction-engaged with the driving shaft such that the flat shaft sliding faces are clamped by the moving member sliding faces,
wherein the moving member includes:
a moving member main body having one of the flat moving member sliding faces;
a cap member having the other of the flat moving member sliding faces; and
a spring that presses the moving member main body and the cap member toward the driving shaft, said spring having at least two points of application for clamping the driving shaft by applying a force on a top surface of the moving member main body and an opposing force on a bottom surface of the cap member so as to press the moving body towards one of said flat shaft sliding faces and the cap member towards the other of said flat shaft sliding faces.

2. An actuator according to claim 1, wherein the driving shaft is a bar-like member composed of four faces, two flat shaft sliding faces and two curved faces projecting outwardly.

3. An actuator according to claim 1, wherein the moving member main body and the cap member have a direct-regulating structure wherein the moving member main body and the cap member are brought into direct contact with each other when a force tries to separate them, and an indirect-regulating structure wherein the moving member main body and the cap member are brought into contact via the spring when a force tries to separate them.

4. An actuator according to claim 3, wherein the indirect-regulating structure has a configuration in which a surface of the moving member main body and a surface of the cap member are arranged in a regulation section provided between the two points of application of the spring.

5. An actuator according to claim 1, wherein a gap is formed between the moving member and a face of the driving shaft other than the flat shaft sliding faces.

6. An actuator according to claim 3, wherein the moving member is attached to one end of a rotation member that is rotatable around the shaft parallel to the normal of the flat shaft sliding faces.

7. An actuator according to claim 1, wherein said spring applies said forces on the moving member main body and the cap member with endmost portions thereof.

8. An actuator according to claim 1, wherein said cap member has a c-shaped portion that overlaps at least part of a top and bottom surface of the moving member main body.

9. An actuator according to claim 1, wherein said moving member main body has a u-shaped channel that substantially envelops a cross-section of the driving shaft.

10. An actuator comprising:

a driving shaft that is vibratable in the shaft direction by a piezoelectric device disposed at one end; and a moving member that is friction-engaged with the driving shaft and moves on the driving shaft by the vibration of the driving shaft, wherein the driving shaft has two flat shaft sliding faces each being parallel to each other, and the moving member has two flat moving member sliding faces;

wherein the moving member includes a moving member main body, a cap member and a spring, said spring having at least two points of application for clamping the driving shaft by applying a force on a top surface of the moving member main body and an opposing force on a bottom surface of the cap member so as to press the moving body towards one of said flat shaft sliding faces and the cap member towards the other of said flat shaft sliding faces;

wherein the moving member main body and the cap member have a direct-regulating structure wherein the moving member main body and the cap member are brought into direct contact with each other when a force tries to separate them in a direction perpendicular to the flat shaft sliding faces, and an indirect-regulating structure wherein the moving member main body and the cap member are brought into contact via the spring when a force tries to separate them.

11. An actuator according to claim 10, wherein the indirect-regulating structure has a configuration in which a surface of the moving member main body and a surface of the cap member are arranged in a regulation section provided between the two points of application of the spring.

12. An actuator according to claim 10, wherein the indirect-regulating structure has a configuration in which the spring is fixed to the moving member main body and a surface of the cap member is arranged between the regulation section provided at the spring and the moving member main body.

13. An actuator according to claim 10, wherein a gap is formed between the moving member and a face of the driving shaft other than the flat shaft sliding faces.

14. An actuator according to claim 13, wherein the moving member is attached to one end of a rotation member that is rotatable around the shaft parallel to the normal of the flat shaft sliding faces.

\* \* \* \* \*

UNITED STATES PATENT AND TRADEMARK OFFICE
CERTIFICATE OF CORRECTION

PATENT NO. : 7,656,072 B2  Page 1 of 1
APPLICATION NO. : 11/133898
DATED : February 2, 2010
INVENTOR(S) : Yoshiaki Hata and Tadatomi Sougawa It is certified that error appears in the above-identified patent and that said Letters Patent is hereby corrected as shown below:

Column 10:
Line 22 claim 1, delete "at least".
Line 52 claim 6, delete "claim 3," and insert -- claim 5, --.

Column 11:
Line 13 claim 10, delete "at least".

Signed and Sealed this

Sixth Day of April, 2010

David J. Kappos
*Director of the United States Patent and Trademark Office*

UNITED STATES PATENT AND TRADEMARK OFFICE
CERTIFICATE OF CORRECTION

PATENT NO.      : 7,656,072 B2                                    Page 1 of 1
APPLICATION NO. : 11/133898
DATED           : February 2, 2010
INVENTOR(S)     : Hata et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 881 days.

Signed and Sealed this

Thirtieth Day of November, 2010

David J. Kappos
*Director of the United States Patent and Trademark Office*